US008290930B2

(12) United States Patent
Ostrovsky et al.

(10) Patent No.: US 8,290,930 B2
(45) Date of Patent: Oct. 16, 2012

(54) QUERY RESULT GENERATION BASED ON QUERY CATEGORY AND DATA SOURCE CATEGORY (75) Inventors: Igor Ostrovsky, Bellevue, WA (US); John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 12/131,765

(22) Filed: Jun. 2, 2008

(65) Prior Publication Data
US 2009/0299959 A1    Dec. 3, 2009

(51) Int. Cl.
G06F 17/30    (2006.01)
(52) U.S. Cl. .............. 707/713; 707/705; 707/E17.014
(58) Field of Classification Search ........... 707/999.002, 707/E17.014, 705, 713
See application file for complete search history.

(56) References Cited

U.S. PATENT DOCUMENTS

| | | | | |
|---|---|---|---|---|
| 5,850,547 | A * | 12/1998 | Waddington et al. | 718/102 |
| 5,974,408 | A * | 10/1999 | Cohen et al. | 1/1 |
| 6,289,334 | B1 * | 9/2001 | Reiner et al. | 1/1 |
| 6,381,616 | B1 | 4/2002 | Larson et al. | |
| 6,460,027 | B1 * | 10/2002 | Cochrane et al. | 1/1 |
| 6,529,901 | B1 | 3/2003 | Chaudhuri et al. | |
| 6,915,290 | B2 | 7/2005 | Bestgen et al. | |
| 6,947,927 | B2 | 9/2005 | Chaudhuri et al. | |
| 7,249,120 | B2 | 7/2007 | Bruno et al. | |
| 2003/0229640 | A1 * | 12/2003 | Carlson et al. | 707/100 |
| 2006/0074874 | A1 | 4/2006 | Day et al. | |
| 2006/0218129 | A1 | 9/2006 | Muras | |
| 2006/0294065 | A1 | 12/2006 | Dettinger et al. | |
| 2007/0078808 | A1 | 4/2007 | Haas et al. | |
| 2007/0078812 | A1 * | 4/2007 | Waingold et al. | 707/2 |
| 2007/0226186 | A1 | 9/2007 | Ewen et al. | |
| 2008/0059449 | A1 * | 3/2008 | Webster et al. | 707/5 |

OTHER PUBLICATIONS

Harizopoulos, et al., "QPipe A Simultaneously Pipelined Relational Query Engine", International Conference on Management of Data, Proceedings of the 2005 ACM SIGMOD international conference on Management of data, Date: Jun. 14-16, 2005, pp. 383-394, ACM Press New York, USA.
Raman, et al., "Partial Results for Online Query Processing", International Conference on Management of Data, Proceedings of the 2002 ACM SIGMOD international conference on Management of data, Date: Jun. 4-6, 2002, pp. 275-286, ACM Press New York, USA.

* cited by examiner

*Primary Examiner* — Fred I Ehichioya
*Assistant Examiner* — Shiow-Jy Fan (57)    ABSTRACT A method includes receiving a query that identifies an input data source. A query category for a query operator in the received query is identified. A data source category for the input data source is also identified. A results object is generated based on the identified query category and the identified data source category. The results object supports at least one of random access and sequential access to results produced by the query operator.

11 Claims, 7 Drawing Sheets

QUERY RESULT GENERATION BASED ON QUERY CATEGORY AND DATA SOURCE CATEGORY

BACKGROUND

Some software technologies provide developers with the ability to query in-memory data using a syntax that is similar to relational database queries. Objects implementing a standard enumerable interface may be used as an input data source for queries. A variety of chained query operators may be applied to the data sources to build up the query. Query operators may include, for example: (1) Filters (e.g., Where, Take, and Skip); (2) Projections (e.g., Select); (3) Reorderings (e.g., OrderBy and Reverse); (4) Reductions (e.g., First, Last, ElementAt, Min, Max, Count, Any, All, and Aggregate); and (5) Conversions (e.g., ToArray, ToList, ToLookup, and ToDictionary). Typical implementations of these operators are defined in terms of general-purpose interfaces for generality and not more efficient data source ones.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Data sources for queries can each be categorized into one of two types or categories: (1) Random-access (e.g., arrays); and (2) sequential-access (e.g., enumerators). Some query operators can be implemented more efficiently on a random-access data source than on a sequential-access data source. One embodiment provides a method for executing a query that identifies data sources as random-access or sequential-access, maintains the random-access property across query operators in the query, and takes advantage of the random-access property to implement some query operators more efficiently.

In one embodiment, a query is received that identifies an input data source. A query category for a query operator in the received query is identified. A data source category for the input data source is also identified. A results object is generated based on the identified query category and the identified data source category. The results object supports at least one of random-access and sequential access to results produced by the query operator.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs random-access maintaining query execution for a computer system, but the technologies and techniques described herein also serve other purposes in addition to these. In one implementation, one or more of the techniques described herein can be implemented as features within a framework program such as MICROSOFT® .NET Framework, or within any other type of program or service.

Some software technologies provide developers with the ability to query in-memory data using a syntax that is similar to relational database queries. Objects implementing a standard enumerable interface may be used as an input data source for queries. A variety of chained query operators may be applied to the data sources to build up the query. Query operators may include, for example: (1) Filters (e.g., Where, Take, and Skip); (2) Projections (e.g., Select); (3) Reorderings (e.g., OrderBy and Reverse); (4) Reductions (e.g., First, Last, ElementAt, Min, Max, Count, Any, All, and Aggregate); and (5) Conversions (e.g., ToArray, ToList, ToLookup, and ToDictionary).

Data sources for queries can each be categorized into one of two types or categories: (1) Random-access; and (2) sequential-access. Random-access data sources according to one embodiment efficiently support two operations: (1) Accessing an element by index; and (2) reporting the number of elements in the data source. Typically, for a random-access data source, the time complexity of these operations would be constant in the length of the sequence. Sequential-access data sources according to one embodiment do not support efficient length reporting and/or efficient indexed access, and instead provide sequential iteration over the elements in the data source. For example, a C# array is a random-access data source because it supports a Length property that reports the length of the array, and efficient indexed access using the square-brackets operator. Specifically, the LDELEM (load array element) instruction ends up as a simple memory MOV instruction in the assembly, versus a set of interface calls which are less efficient. A singly-linked list, on the other hand, is a sequential-access data source, because accessing elements by index is not an efficient operation. An enumerator is another example of a sequential-access data source. An enumerator does not provide direct access to elements, but rather allows scrolling through elements one-by-one and accessing elements by making interface method calls.

Some query operators can be implemented more efficiently on a random-access data source than on a sequential-access data source. One such query operator is Reverse. Iterating over a random-access data source in reverse is efficient, because the last element can be efficiently computed and accessed, and the second-to-last element can be efficiently accessed, and so on, until the first element is reached. In contrast, to iterate over a sequential-access data source in reverse, the elements from the data source may first be collected into an auxiliary data structure before one can begin accessing the elements. Query operators that can be implemented more efficiently on a random-access data source than on a sequential-access data source include, for example, Reverse, Skip, Last, ElementAt, Count, ToArray, and ToList.

Query results (e.g., final or intermediate results) can also be categorized as random-access or sequential-access. For example, consider the query given in the following Pseudo Code Example I:

Pseudo Code Example I

```
int[ ] arr = {1,2,3,4,5,6,7,8,9,10}
IEnumerable<int> query = arr.Skip(3).Take(3).Select(i => -i)
```

The query given in the above Example I will skip the first three elements in the array of integers (i.e., skip 1, 2, and 3), take the next three elements in the array (i.e., take 4, 5, and 6), and then negate each element that was taken, so the final results of the query will be {-4, -5, -6}. In Example I, "arr" is an array, so it is a random-access data source. Also, the sub-query "arr.Skip(3)" can be considered a random-access data source, because it is possible to efficiently determine that the sub-query will return seven (10-3=7) elements, and it is also possible to access elements efficiently by index because element "i" in "arr.Skip(3)" corresponds to element "i+3" in "arr". In addition, the results of the entire query, "arr.Skip(3).Take(3).Select(i=>-i)", can also be considered a random-access data source because determining the number of elements in the output as well as accessing an element with a particular index can both be implemented efficiently by walking backwards through the query.

In the above Example I, the query results are a random-access data source because none of the query operators in the query disturbs the random-access property. In addition, the output of some query operators supports random access even if the input to these query operators does not support random access. One such example is OrderBy. In a typical implementation, OrderBy reads all input elements, sorts them, and stores the sorted sequence in an array. Thus, at the end of the operation, the output of the OrderBy operator is a random-access data source, regardless of the data source type of the input.

One embodiment provides a query engine and method of executing a query that identifies data sources (e.g., initial data sources and intermediate query results) as random-access or sequential-access, maintains the random-access property across query operators in the query, and takes advantage of the random-access property to implement some query operators more efficiently.

Figure 1:
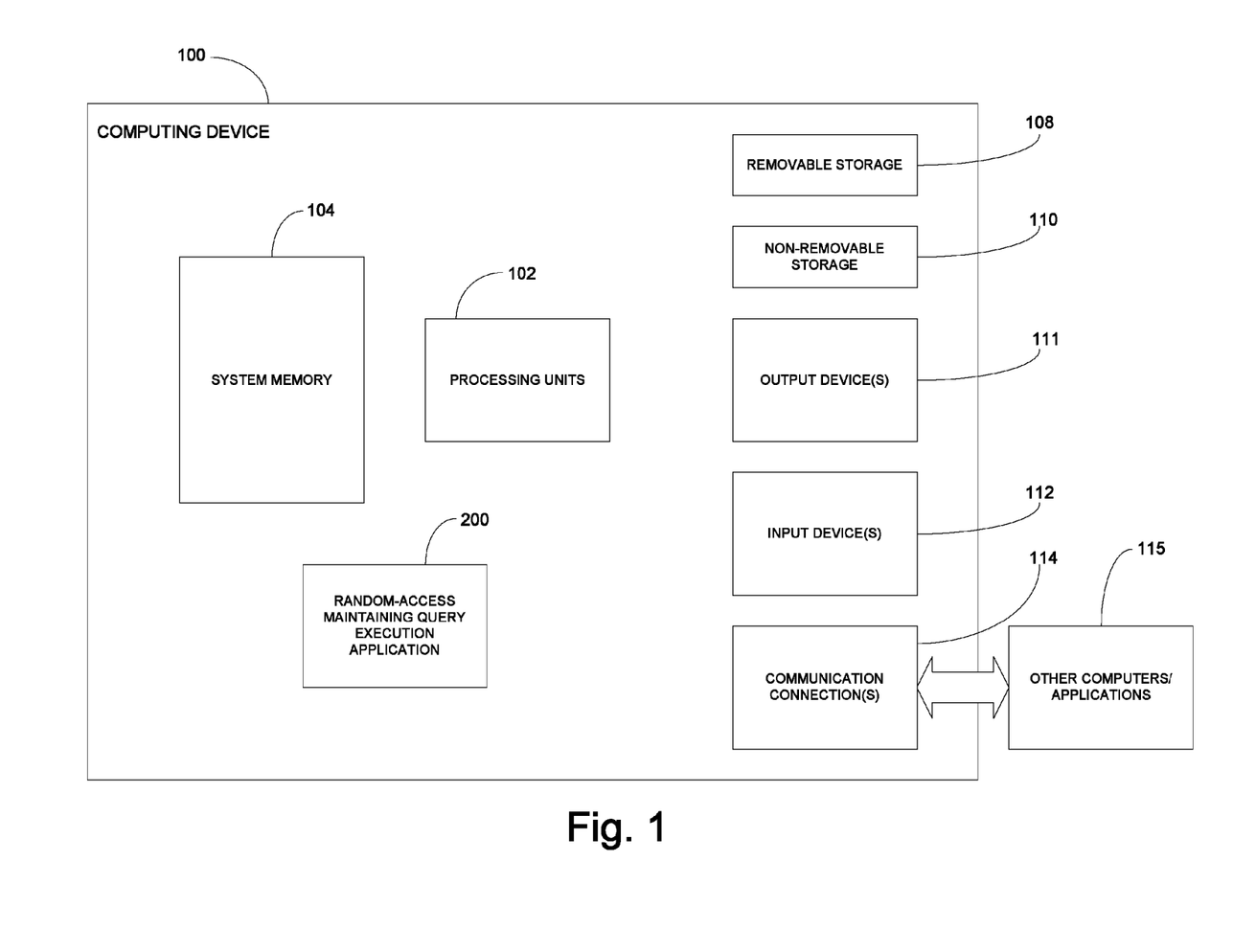
FIG. 1 is a diagram illustrating a computing device suitable for performing random-access maintaining query execution according to one embodiment.

FIG. 1 is a diagram illustrating a computing device 100 suitable for performing random-access maintaining query execution according to one embodiment. In the illustrated embodiment, the computing system or computing device 100 includes a plurality of processing units (i.e., processors or threads) 102 and system memory 104. In one embodiment, computing device 100 is configured to execute queries in a parallel manner using the plurality of processing units 102. In another embodiment, computing device 100 is configured to execute queries in a sequential manner using a single processing unit 102. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes random-access maintaining query execution application 200. Random-access maintaining query execution application 200 is described in further detail below with reference to FIG. 2.

Figure 2:
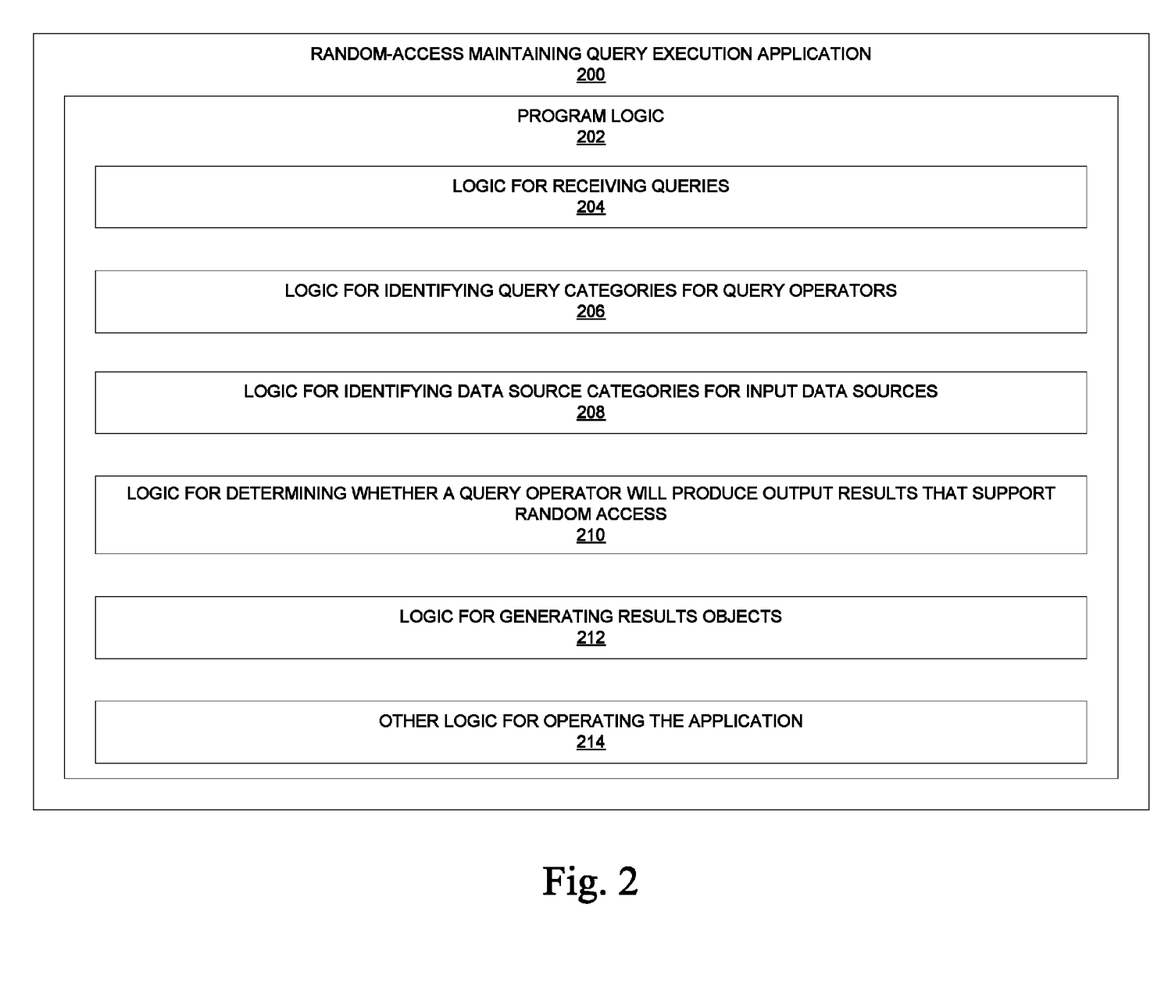
FIG. 2 is a diagrammatic view of one embodiment of a random-access maintaining query execution application for operation on the computing device illustrated in FIG. 1.

FIG. 2 is a diagrammatic view of one embodiment of a random-access maintaining query execution application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Random-access maintaining query execution application 200 includes program logic 202, which is responsible for carrying out some or all of the techniques described herein. Program logic 202 includes logic 204 for receiving queries; logic 206 for identifying query categories for query operators; logic 208 for identifying data source categories for input data sources; logic 210 for determining whether a query operator will produce output results that support random access; logic 212 for generating results objects; and other logic 214 for operating the application.

Turning now to FIGS. 3-6, methods for implementing one or more embodiments of random-access maintaining query execution application 200 are described in further detail. In some implementations, the methods illustrated in FIGS. 3-6 are at least partially implemented in the operating logic of computing device 100.

Figure 3:
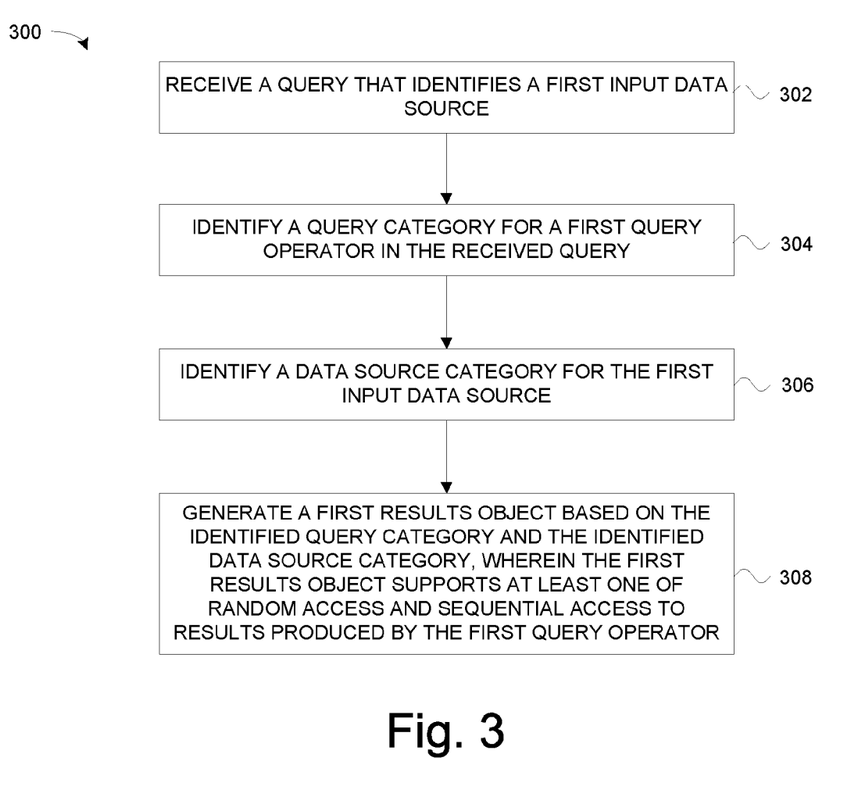
FIG. 3 is a flow diagram illustrating a method for executing a query according to one embodiment.

FIG. 3 is a flow diagram illustrating a method 300 for executing a query according to one embodiment. In one embodiment, computing device 100 is configured to perform method 300 and execute the query in a parallel manner with a plurality of processors. In another embodiment, computing device 100 is configured to execute the query in a sequential manner using a single processor.

At 302 in method 300, a query that identifies a first input data source is received. At 304, a query category for a first query operator in the received query is identified. At 306, a data source category for the first input data source is identified. At 308, a first results object is generated based on the identified query category and the identified data source category, wherein the first results object supports at least one of random access and sequential access to results produced by the first query operator.

In one embodiment, the data source category identified at 306 in method 300 is identified from a group of two data source categories, wherein the two data source categories include a first category for input data sources that support random access to the data source, and a second category for input data sources that do not support random access to the data source. In one embodiment, the query category identified at 304 in method 300 is identified from a group of three query categories, wherein the three query categories include a first category (e.g., a random-access-providing category) for query operators that provide an output that supports random access regardless of whether the input to the operator supports random access, a second category (e.g., a random-access-maintaining category) for query operators that provide an output that supports random access when an input of the query operator supports random access, and a third category (e.g., a random-access-disturbing category) for query operators that provide an output that does not support random access. Examples of query operators that fall under the first category according to one embodiment include Scan over an array, and OrderBy. Examples of query operators that fall under the second category according to one embodiment include Select, Reverse, Take, Skip, and Concat. Examples of query operators that fall under the third category according to one embodiment include Where and Join. The Select operator actually changes the value of the underlying element, so when its interface is accessed using a random-access-style index, it is able to mutate the element "in flight" by itself, turning around and indexing into some data source.

The first results object generated at 308 in method 300 according to one embodiment is generated based on the identified query category and based on whether the input data source supports random access to the data source. In one embodiment, the first results object generated at 308 in method 300 supports both random access and sequential access to results produced by the first query operator if the first query operator is identified as being in the first category. In another embodiment, the first results object generated at 308 supports only sequential access to results produced by the first query operator if the first query operator is identified as being in the third category. In another embodiment, the first results object generated at 308 supports both random access and sequential access to results produced by the first query operator if the identified data source category indicates that the first input data source supports random access and if the first query operator is identified as being in the second category. In yet another embodiment, the first results object generated at 308 supports only sequential access to results produced by the first query operator if the identified data source category indicates that the first input data source does not support random access and if the first query operator is identified as being in the second category.

In one embodiment, the first results object generated at 308 in method 300 supports sequential access to results produced by the first query operator by returning an enumerator object for enumerating over the results produced by the first query operator. In one embodiment, the first results object generated at 308 supports random access to results produced by the first query operator by providing a first method for returning a value representing a number of elements in the results produced by the first query operator, and a second method for returning an indexed element from the results produced by the first query operator.

Figure 4:
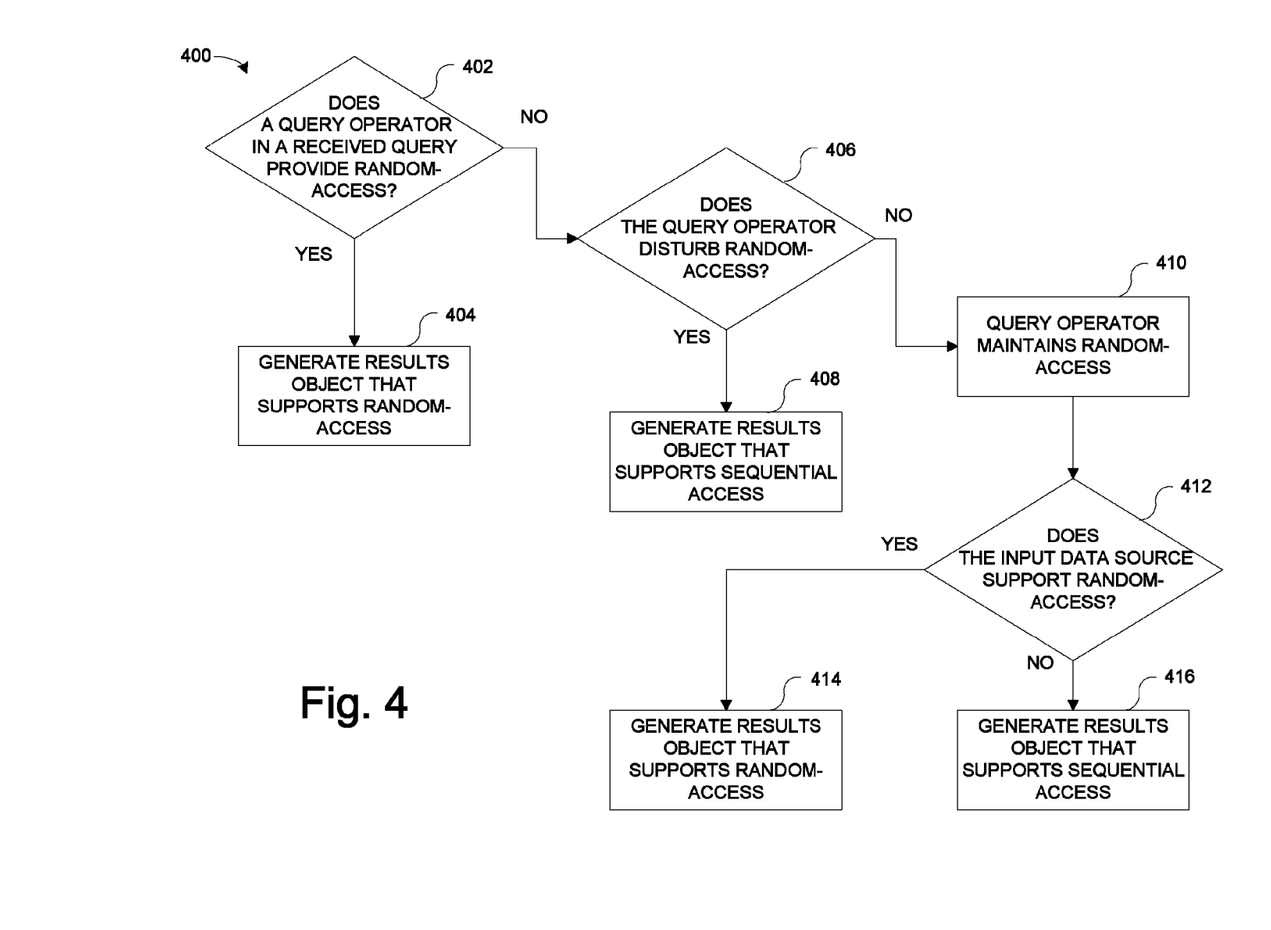
FIG. 4 is a flow diagram illustrating a method of generating a results object based on an identified query category and an identified data source category according to one embodiment.

FIG. 4 is a flow diagram illustrating a method 400 of generating a results object based on an identified query category and an identified data source category, such as that performed at 308 in method 300, according to one embodiment. At 402 in method 400, it is determined whether a query operator in a received query provides random access (i.e., falls under the first, random-access-providing category). If it is determined at 402 that the query operator provides random access, the method 400 moves to 404. At 404, a results object is generated that supports random access to the results of the query operator.

If it is determined at 402 that the query operator does not provide random access, the method 400 moves to 406. At 406, it is determined whether the query operator disturbs random access (i.e., falls under the third, random-access-disturbing category). If it is determined at 406 that the query operator disturbs random access, the method 400 moves to 408. At 408, a results object is generated that supports sequential access to the results of the query operator.

If it is determined at 406 that the query operator does not disturb random access, the method 400 moves to 410, which indicates that the query operator maintains random access (i.e., falls under the second, random-access-maintaining category). At 412, it is determined whether the input data source for the query operator supports random access. If it is determined at 412 that the input data source supports random access, the method 400 moves to 414. At 414, a results object is generated that supports random access to the results of the query operator. If it is determined at 412 that the input data source does not support random access, the method 400 moves to 416. At 416, a results object is generated that supports sequential access to the results of the query operator.

It will be understood that the queries in methods 300 and 400 may each include multiple query operators, and the methods, or particular steps within the methods, may be repeated for each query operator. For example, if a data source is a random-access source, a first query operator may be able to use the random-access property to execute faster. If the first query operator preserves the random-access property, the next query operator in the query will also operate on random-access data.

Figure 5:
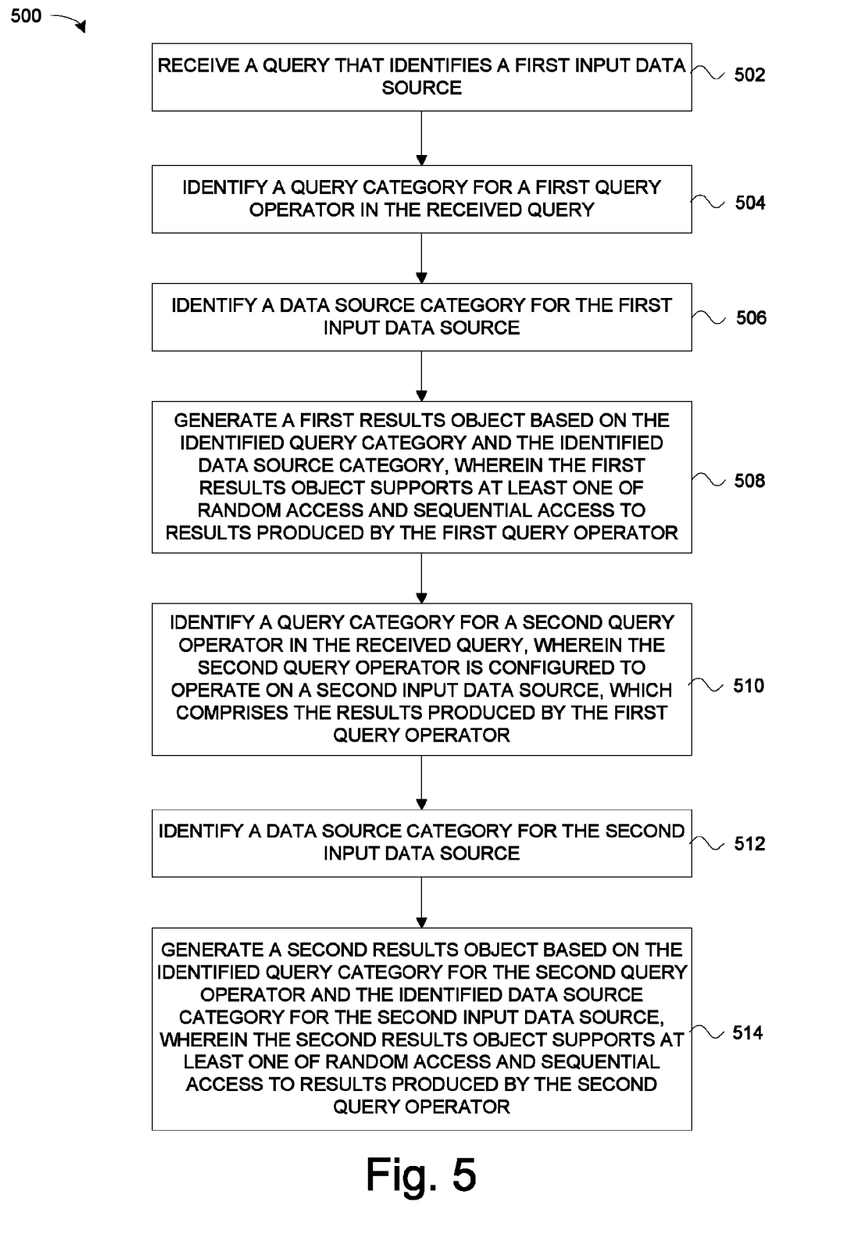
FIG. 5 is a flow diagram illustrating a method for executing a query according to another embodiment.

FIG. 5 is a flow diagram illustrating a method 500 for executing a query according to another embodiment. At 502 in method 500, a query that identifies a first input data source is received. In one embodiment, the first input data source is configured to support one of random access or sequential access. At 504, a query category for a first query operator in the received query is identified. In one embodiment, the first query operator is configured to operate on the first input data source. At 506, a data source category for the first input data source is identified. At 508, a first results object is generated based on the identified query category and the identified data source category, wherein the first results object supports at least one of random access and sequential access to results produced by the first query operator. At 510, a query category for a second query operator in the received query is identified, wherein the second query operator is configured to operate on a second input data source, which comprises the results produced by the first query operator. At 512, a data source category for the second input data source is identified. At 514, a second results object is generated based on the identified query category for the second query operator and the identified data source category for the second input data source, wherein the second results object supports at least one of random access and sequential access to results produced by the second query operator.

Figure 6:
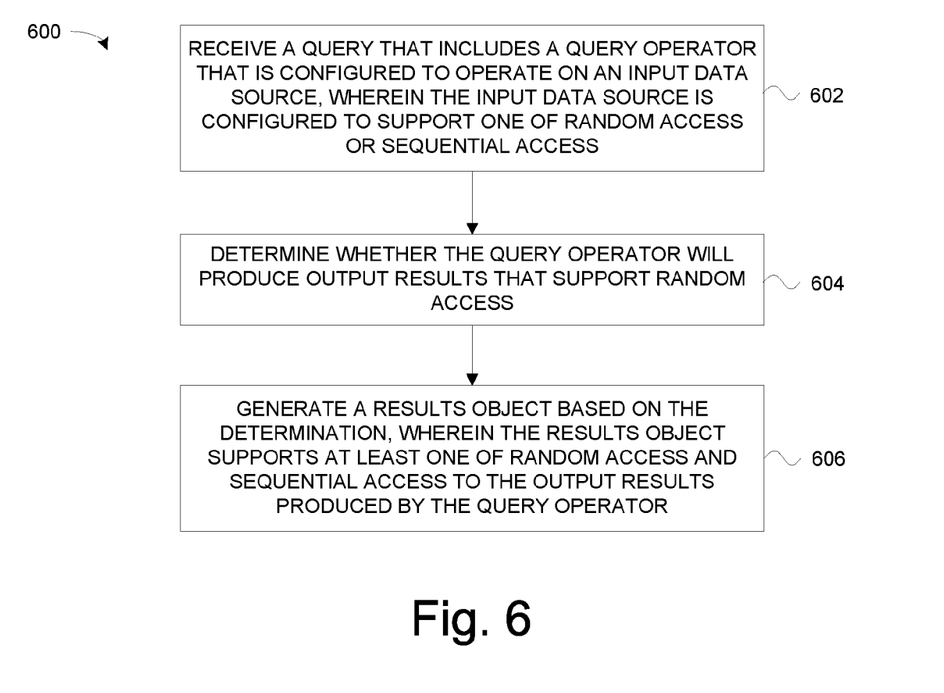
FIG. 6 is a flow diagram illustrating a method for executing a query according to another embodiment.

FIG. 6 is a flow diagram illustrating a method 600 for executing a query according to another embodiment. At 602 in method 600, a query that includes a query operator that is configured to operate on an input data source is received, wherein the input data source is configured to support one of random access or sequential access. At 604, it is determined whether the query operator will produce output results that support random access. At 606, a results object is generated based on the determination at 604, wherein the results object supports at least one of random access and sequential access to the output results produced by the query operator.

Figure 7:
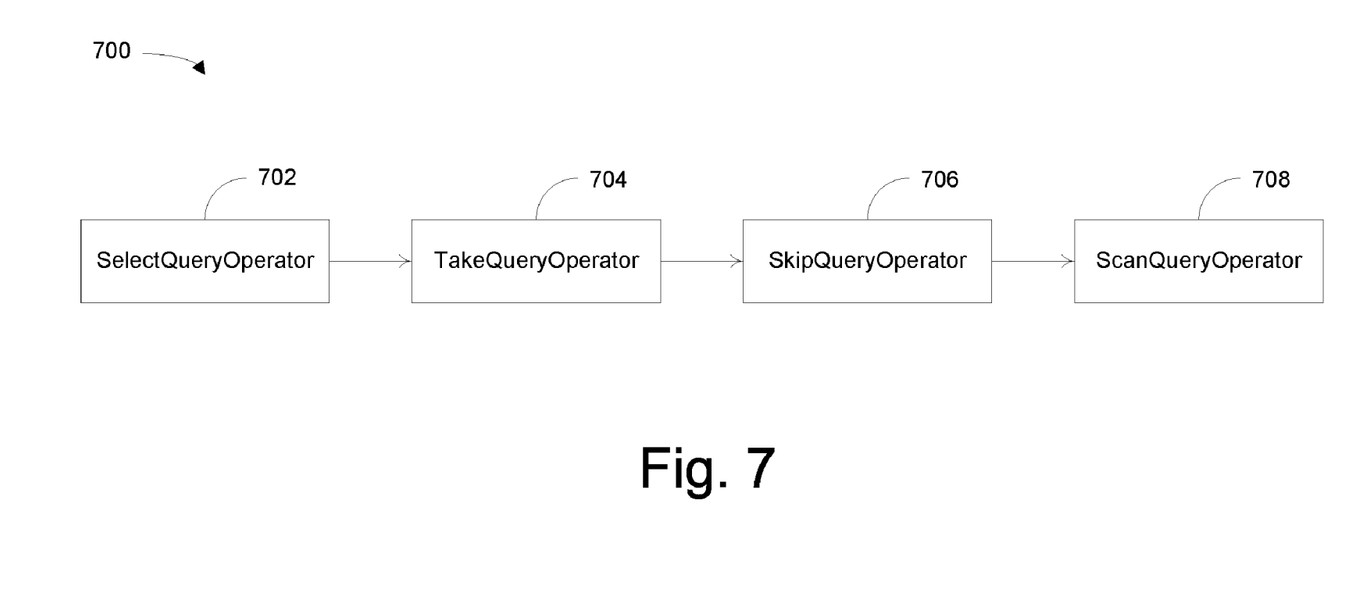
FIG. 7 is a diagram illustrating an abstract syntax tree for an example query according to one embodiment.

In a query engine implementation according to one embodiment, a query is represented as an abstract syntax tree (AST). In one embodiment, each node in the AST is represented as an object of type QueryOperator. FIG. 7 is a diagram illustrating an abstract syntax tree 700 for the example query given in the above Pseudo Code Example I according to one embodiment. The tree 700 includes SelectQueryOperator node 702, TakeQueryOperator node 704, SkipQueryOperator node 706, and ScanQueryOperator node 708. The ScanQueryOperator 708 is a special operator that represents the input sequence. The operator nodes 702-708 in tree 700 map to the operators in the query given in Pseudo Code Example I as follows: SelectQueryOperator node 702 corresponds to "Select(i=>-i)"; TakeQueryOperator node 704 corresponds to "Take(3)"; SkipQueryOperator node 706 corresponds to "Skip(3)"; and as mentioned above, ScanQueryOperator node 708 corresponds to the input data source. In one embodiment, each of SelectQueryOperator 702, TakeQueryOperator 704, SkipQueryOperator 706, and ScanQueryOperator 708 is implemented as an instance of a class that inherits from an abstract class, QueryOperator.

In one example implementation, each class derived from the abstract class, QueryOperator, implements an Open( ) method that returns an enumerator (e.g., an object implementing a .Net Framework IEnumerator<T> interface). In the Open( ) method, the enumerator calls Open( ) on any of its child operators. For example, for the query given in Pseudo Code Example I and represented in FIG. 7, the following sequence of steps would occur:

1. SelectQueryOperator.Open( ) is called
 2. TakeQueryOperator.Open( ) is called
 3. SkipQueryOperator.Open( ) is called
 4. ScanQueryOperator.Open( ) is called
 5. ScanQueryOperator constructs an enumerator over its input and returns it
 6. SkipQueryOperator.Open( ) wraps the enumerator with its own enumerator
 7. SkipQueryOperator.Open( ) wraps the enumerator with its own enumerator
 8. SkipQueryOperator.Open( ) wraps the enumerator with its own enumerator.

The result of this process is an enumerator that will compute results of the query when iterated over. In one embodiment, this process is optimized for random-access data sources by categorizing query operators into three categories (e.g., random-access-providing, random-access-maintaining, and random-access-disturbing), and returning query result objects (rather than just returning enumerators), as described above with respect to FIG. 3. The random-access optimization is implemented in one embodiment by modifying the signature of QueryOperator.Open( ) so that it returns an abstract representation of the query results, an instance of class QueryResults, rather than an instance of IEnumerator. Each QueryResults instance according to one embodiment supports sequential access to the results via a GetEnumerator( ) method that returns an object representing an enumerator over the query results. In addition, if the QueryResults instance was produced by a random-access-providing query operator, or a random-access-maintaining query operator whose input supports random access, the QueryResults instance also supports random access in one embodiment.

The following Pseudo Code Example II shows the QueryResults abstract class according to one embodiment:

Pseudo Code Example II

```
public abstract class QueryResults<T>
{
    public abstract IEnumerator<T> GetEnumerator( );
    public abstract bool SupportsRandomAccess( );
    public abstract int ResultsCount( );
    public abstract T GetElement(int index);
}
```

In one embodiment, the results objects described above with respect to FIGS. 3-6 are instances of the QueryResults abstract class given in the above Pseudo Code Example II.

The following Pseudo Code Example III shows an example of a concrete class for the Select query operator derived from the abstract QueryResults class given in Pseudo Code Example II according to one embodiment:

Pseudo Code Example III

```
public class SelectOperatorQueryResults<TIn, TOut> :
QueryResults<TOut>
    {
        private QueryResults<TIn> childQueryResults;
        private Func<Tin,Tout> selectProjection;
        //Omitted: constructors that initialize the above fields
        public IEnumerator<TOut> GetEnumerator( )
        {
            // Return an enumerator that enumerates over the
            // enumerator returned by
            // childQueryResults.GetEnumerator( ) and applies
            // selectProjection to each element
        }
        public bool SupportsRandomAccess( )
        {
            return childQueryResults.SupportsRandomAccess( );
        }
        public int ResultsCount( )
```

```
{
    return childQueryResults.ResultsCount( );
}
public TOut GetElement(int index)
{
    return selectProjection(childQueryResults.GetElement(index));
}
}
```

Other query operators may be implemented in a similar manner to that shown in Example III for the Select query operator.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
   receiving a query that identifies a first input data source;
   identifying a query category from a group of query categories for a first query operator in the received query based on whether the first query operator provides an output that supports random access, wherein the query categories include a first category for query operators that provide an output that supports random access, a second category for query operators that provide an output that supports random access when an input of the query operator supports random access, and a third category for query operators that provide an output that does not support random access;
   identifying a data source category for the first input data source from a group of data source categories, wherein the data source categories include a first category for input data sources that support random access to the data source, and a second category for input data sources that do not support random access to the data source; and
   generating a first results object based on the identified query category and the identified data source category, wherein the first results object supports at least one of random access and sequential access to results produced by the first query operator, and wherein the first results object supports random access to results produced by the first query operator by providing a first method for returning a value representing a number of elements in the results produced by the first query operator, and a second method for returning an indexed element from the results produced by the first query operator.

2. The computer-readable storage medium of claim 1, wherein the first results object supports both random access and sequential access to results produced by the first query operator if the first query operator is identified as being in the first category.

3. The computer-readable storage medium of claim 1, wherein the first results object supports only sequential access to results produced by the first query operator if the first query operator is identified as being in the third category.

4. The computer-readable storage medium of claim 1, wherein the first results object supports both random access and sequential access to results produced by the first query operator if the identified data source category indicates that the first input data source supports random access and if the first query operator is identified as being in the second category.

5. The computer-readable storage medium of claim 1, wherein the first results object supports only sequential access to results produced by the first query operator if the identified data source category indicates that the first input data source does not support random access and if the first query operator is identified as being in the second category.

6. The computer-readable storage medium of claim 1, wherein the query includes a second query operator that operates on a second input data source, and wherein the second input data source comprises the results produced by the first query operator.

7. The computer-readable storage medium of claim 6, wherein the method further comprises:
   identifying a query category for the second query operator;
   identifying a data source category for the second input data source; and
   generating a second results object based on the identified query category for the second query operator and the identified data source category for the second input data source, wherein the second results object supports at least one of random access and sequential access to results produced by the second query operator.

8. The computer-readable storage medium of claim 1, wherein the first results object supports sequential access to results produced by the first query operator by returning an enumerator object for enumerating over the results produced by the first query operator.

9. The computer-readable storage medium of claim 1, wherein the method further comprises:
   executing the query in a parallel manner with a plurality of processors.

10. A computer-implemented method for executing a query, comprising:
    receiving a query that includes a query operator and that identifies an input data source;
    identifying a query category from a group of query categories for the query operator in the received query based on whether the query operator provides an output that supports random access, wherein the query categories include a first category for query operators that provide an output that supports random access, a second category for query operators that provide an output that supports random access when an input of the query operator supports random access, and a third category for query operators that provide an output that does not support random access;
    generating a results object based on the identified query category and based on an identification of whether the input data source supports random access to the data source or does not support random access to the data source, wherein the results object supports at least one of random access and sequential access to results produced by the query operator, and wherein the results object supports random access to results produced by the query operator by providing a first method for returning a value representing a number of elements in the results produced by the query operator, and a second method for returning an indexed element from the results produced by the query operator; and
    wherein the receiving, identifying, and generating are performed by at least one processor.

11. The method of claim 10, wherein the results object supports sequential access to results produced by the query operator by returning an enumerator object for enumerating over the results produced by the query operator.

* * * * *